(12) United States Patent
Grossman et al.

(10) Patent No.: US 9,411,482 B2
(45) Date of Patent: Aug. 9, 2016

(54) VISUALIZING USER INTERFACES

(75) Inventors: Tovi Grossman, Toronto (CA); George William Fitzmaurice, Toronto (CA); Michael Rooke, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 807 days.

(21) Appl. No.: 13/223,424

(22) Filed: Sep. 1, 2011

(65) Prior Publication Data

US 2012/0054653 A1  Mar. 1, 2012

Related U.S. Application Data

(60) Provisional application No. 61/379,219, filed on Sep. 1, 2010.

(51) Int. Cl.
*G06F 3/048* (2013.01)

(52) U.S. Cl.
CPC ..................... *G06F 3/048* (2013.01)

(58) Field of Classification Search
CPC .......... G06F 8/20; G06F 3/048; G06F 3/0481
USPC ................... 715/764, 763, 761, 780
See application file for complete search history.

(56) References Cited

U.S. PATENT DOCUMENTS

| | | | |
|---|---|---|---|
| 6,121,968 A * | 9/2000 | Arcuri et al. .................. 715/825 |
| 6,968,511 B1 | 11/2005 | Robertson et al. |
| 7,447,999 B1 | 11/2008 | Robertson et al. |
| 8,311,188 B2 | 11/2012 | Rohde et al. |
| 2002/0112237 A1 * | 8/2002 | Kelts ................................ 725/39 |
| 2003/0035012 A1 * | 2/2003 | Kurtenbach et al. .......... 345/810 |
| 2008/0313561 A1 * | 12/2008 | Tsao et al. ..................... 715/810 |
| 2010/0229110 A1 * | 9/2010 | Rockey et al. ................ 715/760 |
| 2010/0257479 A1 * | 10/2010 | Do et al. ....................... 715/780 |
| 2010/0316276 A1 * | 12/2010 | Torti ............................. 382/131 |
| 2011/0283227 A1 * | 11/2011 | Moore et al. .................. 715/800 |
| 2012/0284111 A1 | 11/2012 | Shi et al. |
| 2012/0323934 A1 | 12/2012 | Amir et al. |

* cited by examiner

*Primary Examiner* — William Bashore
*Assistant Examiner* — Jeanette J Parker
(74) *Attorney, Agent, or Firm* — Fish & Richardson P.C.

(57) ABSTRACT

Methods, systems, and apparatus, including computer programs encoded on a computer storage medium, for visualizing user interfaces. In one aspect, a method includes presenting a user interface visualization for an application. The application is configured to perform functions and present a graphical user interface including user interface elements to access the functions. Presenting the user interface visualization for the application includes selecting a group of related functions and presenting a graphical representation for each related function. The graphical representations for the related functions are presented in proximity to each other, and the graphical representations are presented differently than the user interface elements for the related functions are presented by the graphical user interface of the application.

28 Claims, 10 Drawing Sheets

VISUALIZING USER INTERFACES

CROSS-REFERENCE TO RELATED APPLICATIONS

This application claims the benefit under 35 U.S.C. §119 (e) of U.S. Patent Application No. 61/379,219, entitled "VISUALIZING USER INTERFACES," filed Sep. 1, 2010, which is incorporated herein by reference in its entirety.

BACKGROUND

This specification relates to visualizing user interfaces presented by computers.

Computer software applications can expose an overwhelming amount of functionality to its users. With so many functions, the majority of a user interface (UI) can be hidden in the default view to maximize screen real estate for a working document. Graphical user interfaces serve as tools for access to various functions of the application, e.g., by provided mechanisms for user to navigate through various ribbons, dialog boxes, tabs, and menu systems. Although a graphical user interface can provide a logical structure for interaction, users can have trouble locating desired functions, and some functions can be hidden away in nested UI elements.

SUMMARY

A system of one or more computers provides user interface visualizations. A UI visualization is an alternative representation of a UI for improving a user's experience in using an application. A UI visualization illustrates functions of an application by displaying graphical representations of the functions, and the UI visualization displays those graphical representations differently than the UI displays the user interface elements. For example, functions can be illustrated by icons displayed in a grid or overlaying a map.

In general, one aspect of the subject matter described in this specification can be embodied in methods that include the actions of presenting a user interface visualization for an application, wherein the application is configured to perform a plurality of functions, and wherein the application is configured to present a graphical user interface including a plurality of user interface elements to access the functions, and wherein presenting the user interface visualization for the application comprises: selecting a group of related functions; and presenting a graphical representation for each related function, wherein the graphical representations for the related functions are presented in proximity to each other, and wherein the graphical representations are presented differently than the user interface elements for the related functions are presented by the graphical user interface of the application. Other embodiments of this aspect include corresponding systems, apparatus, and computer programs, configured to perform the actions of the methods, encoded on computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. Presenting a graphical representation for each related function comprises presenting the graphical representations in a grid view layout including rows and columns of graphical representations. Presenting a graphical representation for each related function comprises: displaying a map including a plurality of regions; presenting the graphical representations for the related functions over one of the regions of the map; and presenting additional graphical representations for a different group of related functions of the application over a different region of the map. Presenting a graphical representation for each related function comprises sorting the related functions by usage data for each function and presenting the graphical representations in an order based on the sorting. Presenting a graphical representation for each related function comprises, for each related function, identifying associated data for the function and presenting the graphical representation for the function based on the associated data. Presenting the graphical representation for the function based on the associated data includes presenting the graphical representation with a size, level of granularity, level of highlighting, or level of opacity based on the associated data. The associated data is usage data or data indicating a release version. Selecting the group of related functions includes selecting functions that are related by one or more of: a usage category, a functional category, corresponding user interface elements' locations in the graphical user interface, and how deeply nested the functions are in a hierarchy of the graphical user interface. The actions can further comprise: receiving input selecting a graphical representation; and providing textual information associated with the function corresponding to the graphical representation. The graphical user interface for the application includes space for viewing a document, and wherein the user interface visualization lacks space for viewing a document.

Particular embodiments of the subject matter described in this specification can be implemented so as to realize one or more of the following advantages. Users can explore features of an application using a UI visualization. Users can locate specific features using the UI visualization. Users can gain understanding of feature relations, e.g., functions that accomplish similar goals, or functions that are often used together. Users can discover new features, which can be helpful to transitioning users to expert users. Users can better understand their own usage of an application and how their usage might relate to other users. A UI visualization can serve as a platform for communication between users. Similar visualizations of two or more applications can be used to compare the relative functionality of each application, e.g., so that users can more easily transition from one application to another.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
FIG. 1 illustrates two displays for a computer system that executes a software application.

FIG. 1 illustrates two displays for a computer system that executes a software application. A first display 102 displays a user interface (UI) for the application. The second display 104 displays a UI visualization for the UI for the application.

The application can be, for example, a Computer Aided Design (CAD) application, a word processor, a multimedia editing tool, or the like. The application performs various functions, e.g., related to CAD, word processor, or multimedia editing. The UI displayed on the first display 102 includes various UI elements, e.g., icons, toolbars, menus, menu items, dialog boxes, tool parameters, and so on. A user can use the UI elements to cause the application to perform its functions. Typically, a UI includes space for editing or viewing a document. To increase the amount of space available for viewing a document, the UI elements can be nested so that many of them are out of sight. Moreover, the UI elements can be placed in areas that are convenient for a user who is editing a document, rather than in areas that are useful to a user who is learning how to use the application.

The UI visualization on the second display 104 presents graphical representations that illustrate functions of the application. The graphical representations can take various forms and can be, e.g., UI elements, representative icons, or textual descriptions. For example, the graphical representation of a function can be an icon of a UI element for accessing that function from the UI for the application. If a function of the application does not have a UI element for accessing the function, the UI visualization can include a default or placeholder icon as the graphical representation of a function. For example, the UI visualization can include graphical representations of functions accessed by hotkey accelerators, which is useful, for example, because users are often unaware of those functions.

The UI visualization can present graphical representations of functions at different levels of granularity. For example, a coarse grain visualization can present dialog boxes or menus, and a detailed visualization can present individual elements within a dialog box, or individual menu items. The UI visualization can also present graphical representations of different sizes and colors to convey additional information. The size or color of a graphical representation can be used to represent any quantitative data associated with the function, e.g., its frequency of use or number of child functions.

The layout of the graphical representations of functions is different in the UI visualization than the layout of UI elements in the UI. The UI visualization need not display any particular document for viewing and editing. The UI visualization can display more graphical representations of functions than UI elements displayed in the UI, and the UI visualization can display those UI elements in way to assist users in learning to use the application.

There are various ways that the graphical representations of functions can be laid out in the UI visualization. For example, the functions can be clustered by usage or functional category. Functional and usage categories can be determined, for example, manually by a user inspecting the application, or automatically by a UI visualization program that analyzes the application, e.g., by parsing the application source code for indicators of functional or usage categories.

In another example, the UI visualization layout can be based on the UI elements locations in the UI for the application, or how deeply the UI elements are nested in the UI access hierarchy. The UI access hierarchy specifies what UI elements provide access to other UI elements, e.g., so that a dialog box accessed by a menu item is nested under the menu item. In another example, the layout can arrange graphical representations in a table, indexing the functions by name or some other ordered feature. The layout can include real-world landmarks (e.g., countries on a geographic map), which is useful, for example, to help users form a cognitive model of the user interface.

In general, the UI visualization is interactive, although a static UI visualization is possible. The UI visualization can provide various types of interactions, e.g., navigation, annotations, filtering, sorting, and grouping. For example, some UI visualizations can allow a user to pan and zoom using an input device, e.g., a mouse. The UI visualization can serve as a learning tool by linking graphical representations of functions to help articles or tutorials. The UI visualization can display tooltips that indicate, e.g., a name of a function when a cursor is over a graphical representation for the function. The UI visualization can have some parts that are interactive (e.g., certain regions or certain graphical representations) and other parts that are not. For example, the interactive parts can be highlighted.

The UI visualization can execute independently of the application. For example, the UI visualization can be a standalone application that does not depend on the underlying application on which the UI visualization is built. The UI visualization can also be configured to execute and communicate in real-time with the application itself. For example, as shown in FIG. 1, the UI for the application can be on the first display 102 and the UI visualization can be on the second display 104. This is useful, for example, so that the UI visualization can display the user's current usage patterns, and highlight functions that were used most recently. This is also useful, for another example, so that the user can trigger the application to execute a function from within the UI visualization (e.g., by double clicking a graphical representation.)

Although FIG. 1 illustrates an example system setup with two displays, various other setups are possible. For example, the system can include a single monitor, e.g., that displays both the application's UI and the UI visualization, or just the UI visualization. The UI visualization can be printed out. Interactive visualization can occur on a secondary device, e.g., a tablet or a mobile phone.

Figure 2:
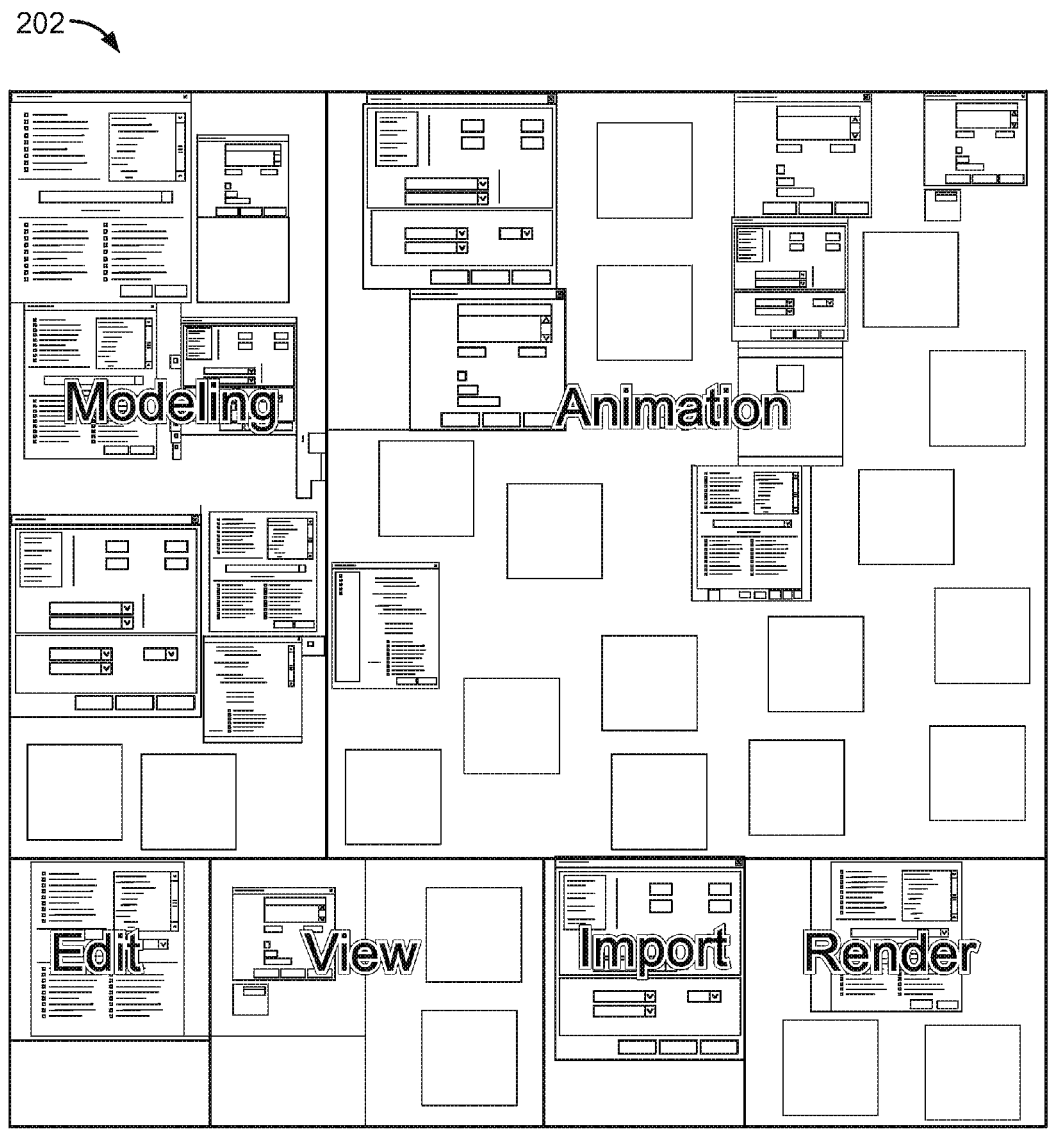
FIG. 2 illustrates an example TreeMap style layout of a UI visualization.

FIG. 2 illustrates an example TreeMap style layout 202 of a UI visualization. The layout 202 is divided into six rectangular areas. Each area depicts graphical representations of functions that are in a same functional category. The relative size of each region can represent the corresponding proportion of functionality contained with the application. In addition, the size of each graphical representation can be based on usage data for the graphical representation's function, e.g., the frequency of use of that function.

Figure 3:
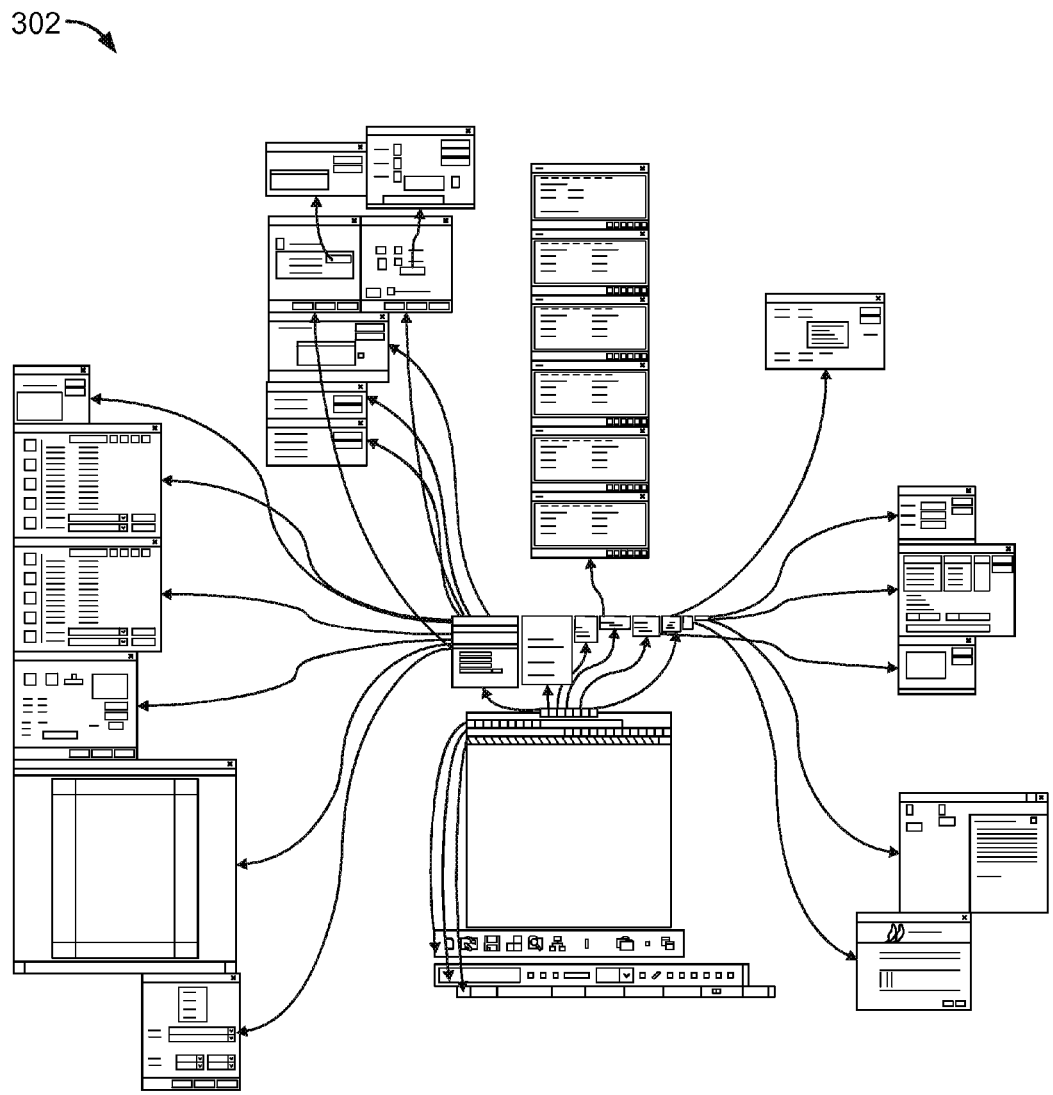
FIG. 3 illustrates an example node-and-stick style layout of a UI visualization.

FIG. 3 illustrates an example node-and-stick style layout 302 of a UI visualization. The UI visualization is for an application having pull-down menus. The graphical representations of functions are arranged according to the pull-down menus from which the functions are accessed. For example, pull-down menus are shown in the center of the layout 302, and arrows from items in the menus extend to dialog boxes around the center of the layout 302 that are displayed in response to selecting the items.

Figure 4A:
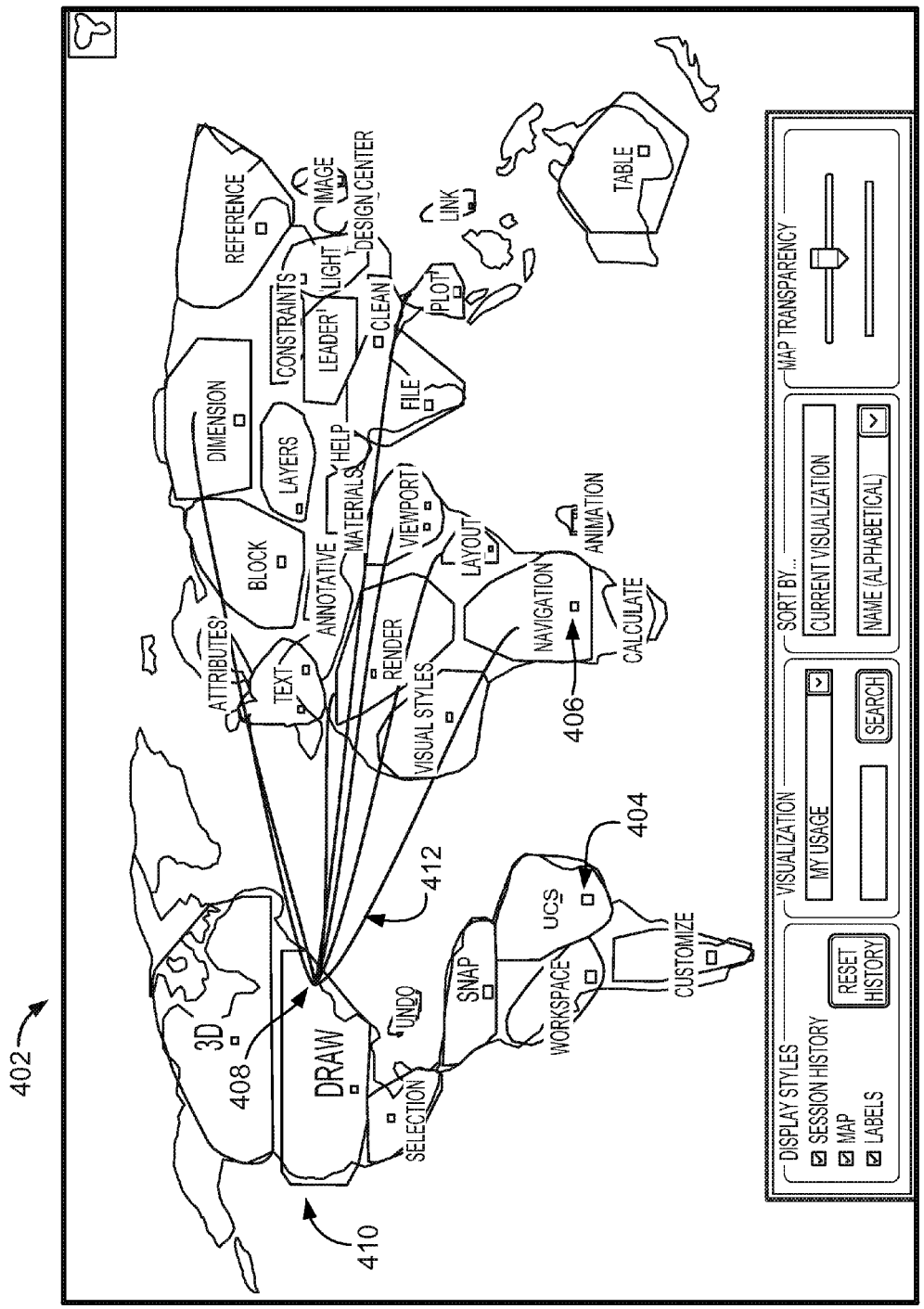
FIGS. 4A and 4B illustrate an example map view layout of a UI visualization.
Figure 4B:
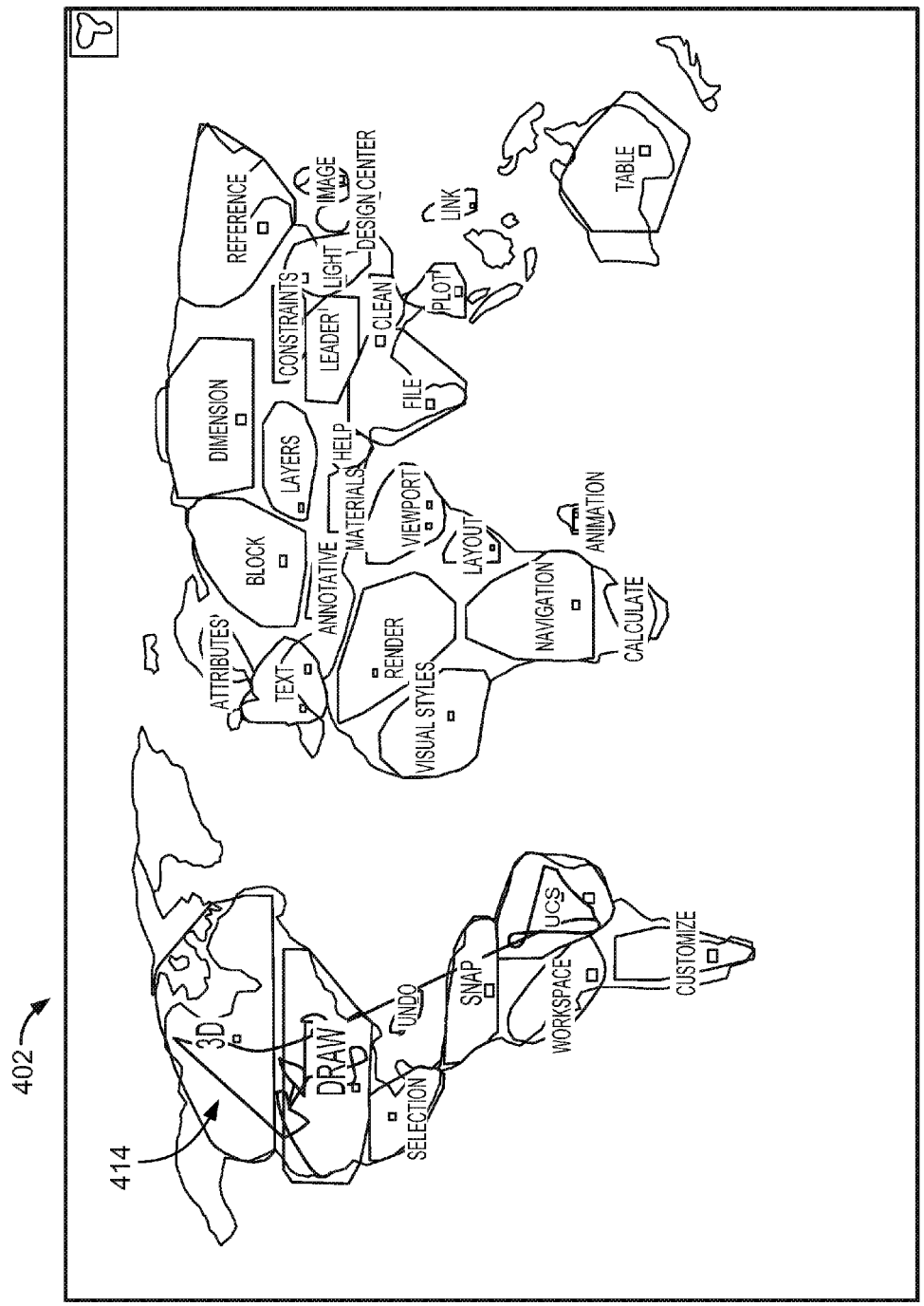

FIGS. 4A and 4B illustrate an example map view layout 402 of a UI visualization. In the map view layout 402, icons (e.g., 404 and 406) representing functions are overlaid on a map of the world. The functions are grouped into functional categories, and each functional category is arranged over a specific region or country. The region for each functional category can be specified, for example, heuristically, based on group size and relatedness. The region for each functional category can also be specified according to size, popularity, or other usage metrics. Although an image of map is shown, other types of background images can be used, e.g., an architectural 2D floor plan or biological representation, e.g., a human body. Additionally, 3D spaces can be used. For purposes of clarity, the icons in FIGS. 4A and 4B do not cover entire regions; however, in a UI visualization, the icons can cover entire regions.

FIG. 4A illustrates lines (e.g., 412) that point to likely next used commands. The lines originate from an icon 408 of a function in the "Draw" category, arranged over the United States 410 on the map. The lines end on icons of functions likely to be used after that function. A UI visualization system can determine a next likely used function from usage data. FIG. 4B illustrates lines (e.g., 414) that show a user's recent command history. The lines span across various functions graphically represented in the "3D," "Draw," and "UCS" categories.

Figure 5:
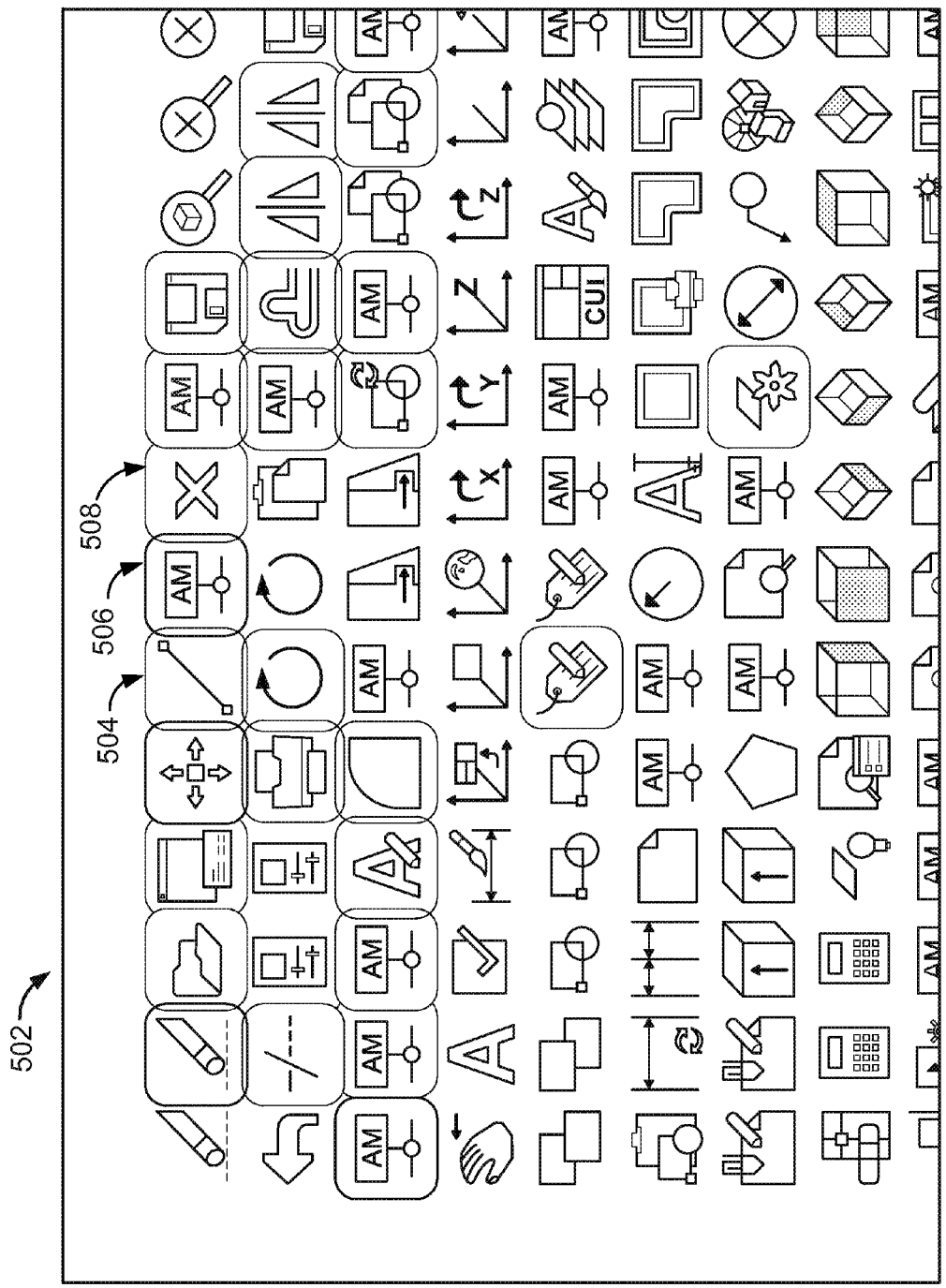
FIG. 5 illustrates an example grid view layout of a UI visualization.

FIG. 5 illustrates an example grid view layout 502 of a UI visualization. The grid view layout 502 includes icons (e.g., 504, 506, and 508) arranged in a rectangular grid. The grid view layout 502 is useful, for example, for sorting icons into arrangements that are not based on functional categories.

The graphical representations displayed in a UI visualization can be sorted according to various criteria. The icons in the grid view layout 502 can be sorted and arranged in the grid, and the icons in the map view layout 402 can be sorted within each region (for each functional category). The icons can be arranged in the grid view layout 502 in various ways. The icons can also be highlighted (e.g., based on usage information) to provide additional information to users.

For example, the icons can be sorted alphabetically according to names of functions represented by the icons. In another example, the icons can be sorted according to community popularity. Community popularity is an example of usage data that indicates how frequently a function is used by users in a community of users of the application. The icons can be sorted from top-to-bottom, left-to-right in order of popularity.

The UI visualization can provide the ability to visualize functions by one data set and sort by another. This is useful, for example, to assist in understanding relationships between data sets. For example, icons can be highlighted by release version and sorted by community popularity. In another example, the icons can be sorted by community popularity and highlighted by a particular user's frequency of use (e.g., where a darker highlight indicates more frequent use and a lighter highlight indicates less frequent use.) That arrangement can be useful, for example, to show a user what popular functions he is not using.

Figure 6:
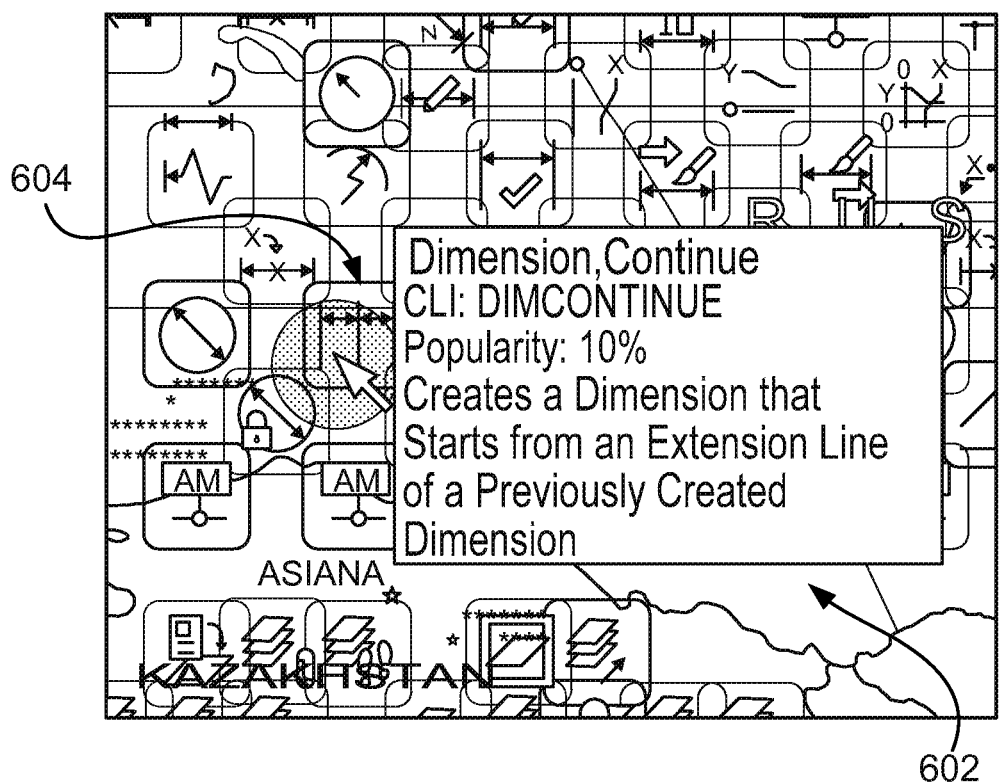
FIG. 6 illustrates an example tooltip that appears over an icon for a function in a UI visualization.

FIG. 6 illustrates an example tooltip 602 that appears over an icon 604 for a function in a UI visualization. The tooltip 602 can appear, for example, in response to a user selecting the icon 604 (e.g., by clicking, double clicking, or even just moving the cursor over the icon.) The tooltip 602 displays various information about the function, e.g., the name of the function, a description of the function, usage data regarding the function, and so on.

Figure 7:
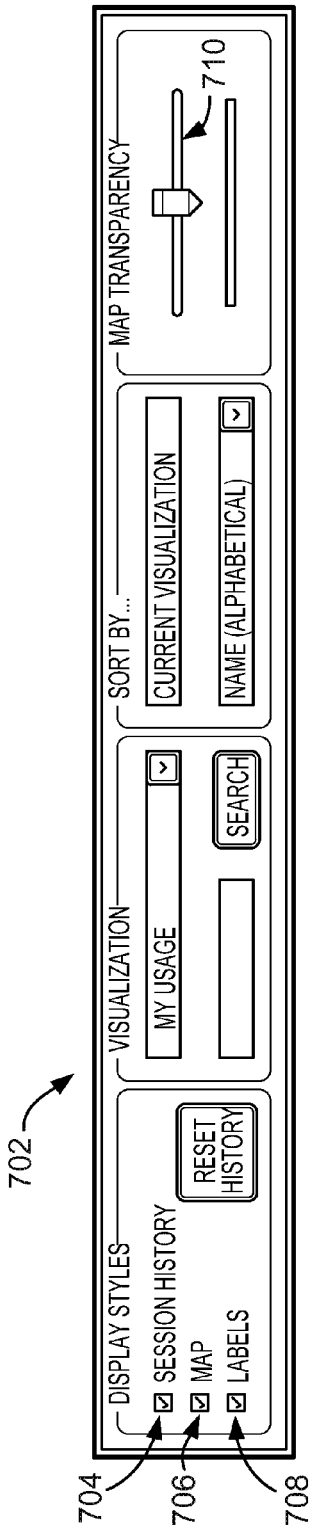
FIG. 7 illustrates an example control panel that can optionally be used to control a UI visualization.

FIG. 7 illustrates an example control panel 702 that can optionally be used to control a UI visualization. The control panel 702 can be used, for example, to set and adjust display styles, control visual overlays, sort icons, search for individual functions, and adjust the transparency of a background image (e.g., a map.)

The control panel 702 can include a checkbox 704 to control the visibility of "flight paths" that are lines between recently used commands (e.g., as illustrated in FIG. 6B.) The flight paths can be based on a real-time command history collected by the application. The flight paths can be useful, for example, to allow quick recognition of areas of the map view that a user has already used, thus helping the user identify functions or entire categories of functions that they do not use. In some implementations, to avoid clutter, flight paths fade over time, e.g., so that only a certain number of curves are ever visible at a time. Additional controls can include, for example, a checkbox 706 to show or hide a background image (e.g., a map), a checkbox 708 to control the visibility of category labels, and a slider 710 that can adjust the transparency of a background image.

The control panel can include a search box. The search box can be used to find functions within the UI visualization. For example, as a user enters each character into the text box, the UI visualization can search for functions that have the current substring in either an associated name or tooltip text. The UI visualization can fade out icons that do not have an associated name or tooltip text including the current substring. Clicking a "search" button can cause the UI visualization to search for an exact function name match. If the command is found, the icon can be highlighted, and the view can be zoomed in to view that icon.

Figure 8A:
FIGS. 8A and 8B illustrate an example UI visualization overlaid with usage data.
Figure 8B:
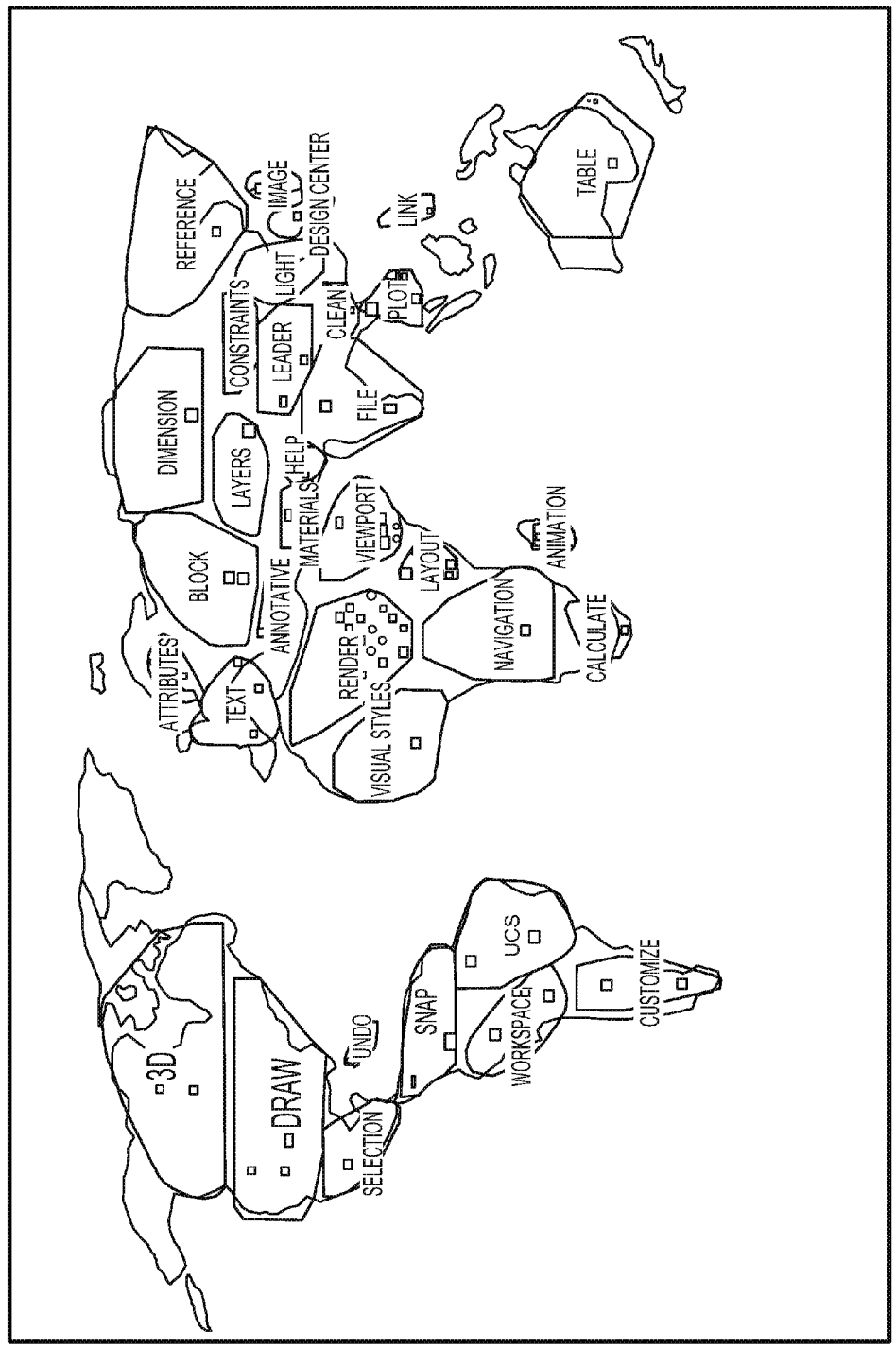

FIGS. 8A and 8B illustrate an example UI visualization overlaid with usage data. In this example, the usage data indicates the popularity of functions, e.g., among users in a community of users of the application as indicated by the use of the functions. FIG. 8A shows an example legend that indicates the current visualization and the range in values. The data value is mapped to the opacity of the color of the icon. Darker icons indicate highly used functions, and lighter icons indicate less frequently used functions. FIG. 8B shows an example map view layout having icons that are highlighted according to popularity.

Various types of data can be overlaid on a UI visualization. Function usage histories can be gathered from, for example, programs that track users' usage of an application. The users can be divided into groups, e.g., new users, typical users, expert users (e.g., professionals who use the application to make money), and so on. Consider four example types of usage data:

Community usage: The overall frequency, relative to all other functions, in which a function is used. For example, a "delete" function can make up 17% of the entire user community's function usage. A function's community usage frequency is an indication of the relative importance of a function.

Community popularity: The fraction of users who have used a function. For example, 95% of users in the community can have used an "erase" function. This is an alternative indication of a function's relative importance.

Expert usage: The frequency for which a function is used by expert users. This is useful, for example, so that user can see what functions expert users are using.

My usage: The frequency that a particular user uses a function. This is useful, for example, so that a user can see and reflect upon his own usage of the application.

A UI visualization can also overlay or highlight the difference between different types of data. For example, the community usage can be compared to the experts' usage. This is useful, for example, to determine what functions experts use more often than the community, and what functions the community uses more often than experts.

A UI visualization can also overlay or highlight using data other than usage data. For example, icons can be displayed with different colors that represent different release versions of the application. This is useful, for example, to help a user identify functions that were recently released but that the user has not yet adopted.

Figure 9:
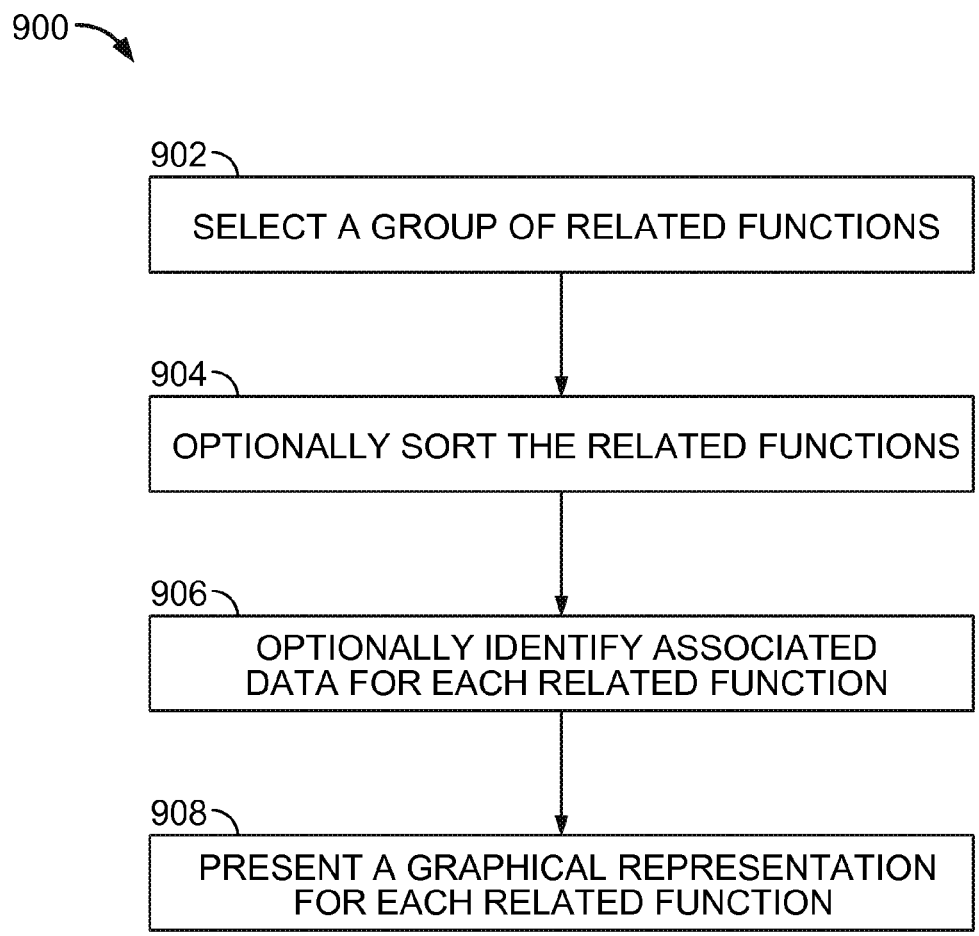
FIG. 9 is a flow diagram of an example process for presenting a user interface visualization.

FIG. 9 is a flow diagram of an example process 900 for presenting a user interface visualization. The user interface visualization is for an application configured to perform various functions, e.g., a CAD application. The application is configured to present a graphical user interface including user interface elements to access the functions.

The process 900 can be performed by a system of one or more computers. For purposes of illustration, the process 900 will be described with respect to a system that performs the process 900.

The system selects a group of related functions (step 902). For example, the system can select functions that are related by one or more of: a usage category, a functional category, corresponding user interface elements' locations in the graphical user interface, and how deeply nested the functions are in a hierarchy of the graphical user interface. The system determines that functions are related, for example, by analyzing a file prepared by a user who has categorized the functions, or by analyzing source code for the application and grouping functions that have similar attributes.

In some implementations, the application generates usage logs, and the application developer can collect usage logs from users in the community. The system can analyze the collected usage logs and compare, for a given function, the overall frequency of the function and one or more functions that are used after the function (the "next" function). The system can then determine groups of related functions as functions that follow one another, e.g., more frequently than randomly.

The system optionally sorts the related functions, e.g., by usage data associated with each function (step 904). For example, the system can sort the related functions by community popularity, as discussed above with reference to FIG. 5.

The system optionally identifies associated data for each function for use in varying presented graphical representations for the functions (step 906). For example, the associated data can be usage data or data indicating a release version. FIGS. 8A and 8B show examples of presenting user interface visualizations overlaid with usage data.

The system presents a graphical representation (e.g., an icon) for each related function (step 908). The system presents the graphical representations for the related functions in proximity to each other. The system present the graphical representations differently than the user interface elements for the related functions are presented by the graphical user interface of the application.

For example, the system can present the graphical representations in a grid view layout including rows and columns of graphical representations, e.g., as described above with reference to FIG. 5. In another example, the system can display a map including regions and present the graphical representations over one of the regions of the map, e.g., as described above with respect to FIGS. 4A and 4B. The system can present additional graphical representations for a different group of related functions of the application over a different region of the map.

If the system performs optional step 904 and sorts the functions, the system presents the graphical representations in an order based on the sorting. For example, the system can present the graphical representations in an order as described above with reference to FIG. 5.

If the system performs optional step 906 and identifies associated data for each function, then the system presents the graphical representation of each function based on the associated data. For example, the system can present a graphical representation with a size, level of granularity, level of highlight, or level of opacity based on the associated data. For example, the system can present the graphical representations as described above with reference to FIGS. 8A and 8B.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
presenting a user interface visualization for an application,
wherein the application is configured to perform a plurality of functions, and
wherein the application is configured to present a graphical user interface including a plurality of user interface elements to access the functions, and
wherein presenting the user interface visualization for the application comprises:
selecting a group of related functions; and
presenting a respective graphical representation for each related function,
wherein the graphical representations are presented in proximity to each other, and
wherein the graphical representations are presented differently than the user interface elements, and
wherein the user interface visualization executes independently of the application on which the user interface visualization is built, and
wherein the graphical user interface for the application is presented on a first display and the user interface visualization for the application is presented on a second display,
the first display and the second display are on first and second physically separate monitors of a computer system, respectively,
wherein the graphical user interface for the application includes space for viewing a document and the user interface visualization lacks space for viewing a document, and
wherein the user interface visualization presented on the second display executes and communicates in real-time with the application presented on the first display, and
wherein the user interface visualization visually presents, for a particular function,
a difference between community usage data and expert usage data on the second display, and
wherein the community usage data indicates an overall frequency for which the particular function, relative to other functions, is used by a community of users of the application, and
wherein the expert usage data indicates a frequency for which the particular function is used by expert users.

2. The method of claim 1, wherein presenting a respective graphical representation for each related function comprises
presenting the graphical representations in a grid view layout including rows and columns of graphical representations.

3. The method of claim 1, wherein presenting a respective graphical representation for each related function comprises:
displaying a map including a plurality of regions;
presenting the graphical representations for the related functions over one of the regions of the map; and
presenting additional graphical representations for a different group of related functions of the application over a different region of the map.

4. The method of claim 1, wherein presenting a respective graphical representation for each related function comprises sorting the related functions by usage data for each function and presenting the graphical representations in an order based on the sorting.

5. The method of claim 1, wherein presenting a respective graphical representation for each related function comprises,
for each related function, identifying associated data for the function and presenting the respective graphical representation for the function based on the associated data.

6. The method of claim 5, wherein presenting the respective graphical representation for the function based on the associated data includes
presenting the respective graphical representation with a size, level of granularity, level of highlighting, or level of opacity based on the associated data.

7. The method of claim 1, wherein presenting a respective graphical representation for each related function comprises,
for each related function, identifying associated data for the function and presenting the respective graphical representation for the function based on the associated data,
wherein the associated data is usage data including one or more of community usage data, community popularity data, expert usage data, and my usage data.

8. The method of claim 1, wherein selecting the group of related functions includes selecting functions that are related by one or more of:
a usage category, a functional category, corresponding user interface elements' locations in the graphical user interface, and how deeply nested the functions are in a hierarchy of the graphical user interface, and wherein determining that the functions are related includes analyzing a file prepared by a user who has categorized the functions or analyzing source code for the application and grouping functions that have similar attributes.

9. The method of claim 1, further comprising:
receiving input selecting a graphical representation; and
providing textual information associated with the function corresponding to the graphical representation.

10. The method of claim 1, wherein the user interface visualization visually presents, for a second function, a plurality of types of usage data on the second display, and wherein the plurality of types of usage data comprise:
community usage data that indicates an overall frequency in which the second function, relative to other functions, is used by a community of users of the application,
community popularity data that indicates a fraction of users in the community who have used the second function,
expert usage data that indicates a frequency for which the second function is used by expert users, and
my usage data that indicates a frequency that a particular user uses the second function.

11. A system of one or more computers configured to perform operations comprising:
presenting a user interface visualization for an application,
wherein the application is configured to perform a plurality of functions, and
wherein the application is configured to present a graphical user interface including a plurality of user interface elements to access the functions, and
wherein presenting the user interface visualization for the application comprises:
selecting a group of related functions; and
presenting a respective graphical representation for each related function,
wherein the graphical representations are presented in proximity to each other, and wherein the graphical representations are presented differently than the user interface elements, and wherein the user interface visualization executes independently of the application on which the user interface visualization is built, and wherein the graphical user interface for the application is presented on a first display and the user interface visualization for the application is presented on a second display, the first display and the second display are on first and second physically separate monitors of a computer system, respectively, wherein the graphical user interface for the application includes space for viewing a document and the user interface visualization lacks space for viewing a document, and wherein the user interface visualization presented on the second display executes and communicates in real-time with the application presented on the first display, and wherein the user interface visualization visually presents, for a particular function, a difference between community usage data and expert usage data on the second display, and wherein the community usage data indicates an overall frequency for which the particular function, relative to other functions, is used by a community of users of the application, and wherein the expert usage data indicates a frequency for which the particular function is used by expert users.

12. The system of claim 11, wherein presenting a respective graphical representation for each related function comprises presenting the graphical representations in a grid view layout including rows and columns of graphical representations.

13. The system of claim 11, wherein presenting a respective graphical representation for each related function comprises: displaying a map including a plurality of regions; presenting the graphical representations for the related functions over one of the regions of the map; and presenting additional graphical representations for a different group of related functions of the application over a different region of the map.

14. The system of claim 11, wherein presenting a respective graphical representation for each related function comprises sorting the related functions by usage data for each function and presenting the graphical representations in an order based on the sorting.

15. The system of claim 11, wherein presenting a respective graphical representation for each related function comprises, for each related function, identifying associated data for the function and presenting the respective graphical representation for the function based on the associated data.

16. The system of claim 15, wherein presenting the respective graphical representation for the function based on the associated data includes presenting the respective graphical representation with a size, level of granularity, level of highlighting, or level of opacity based on the associated data.

17. The system of claim 11,
wherein presenting a respective graphical representation for each related function comprises, for each related function, identifying associated data for the function and presenting the respective graphical representation for the function based on the associated data, wherein the associated data is usage data including one or more of community usage data, community popularity data, expert usage data, and my usage data.

18. The system of claim 11, wherein selecting the group of related functions includes selecting functions that are related by one or more of: a usage category, a functional category, corresponding user interface elements' locations in the graphical user interface, and how deeply nested the functions are in a hierarchy of the graphical user interface, and wherein determining that the functions are related includes analyzing a file prepared by a user who has categorized the functions or analyzing source code for the application and grouping functions that have similar attributes.

19. The system of claim 11, the operations further comprising: receiving input selecting a graphical representation; and providing textual information associated with the function corresponding to the graphical representation.

20. A non-transitory computer storage medium encoded with a computer program, the program comprising instructions that when executed by one or more computers cause the one or more computers to perform operations comprising:
presenting a user interface visualization for an application,
wherein the application is configured to perform a plurality of functions, and
wherein the application is configured to present a graphical user interface including a plurality of user interface elements to access the functions, and
wherein presenting the user interface visualization for the application comprises:
selecting a group of related functions; and
presenting a respective graphical representation for each related function,
wherein the graphical representations are presented in proximity to each other, and
wherein the graphical representations are presented differently than the user interface elements, and
wherein the user interface visualization executes independently of the application on which the user interface visualization is built, and
wherein the graphical user interface for the application is presented on a first display and the user interface visualization for the application is presented on a second display,
the first display and the second display are on first and second physically separate monitors of a computer system, respectively,
wherein the graphical user interface for the application includes space for viewing a document and the user interface visualization lacks space for viewing a document, and
wherein the user interface visualization presented on the second display executes and communicates in real-time with the application presented on the first display, and
wherein the user interface visualization visually presents, for a particular function,
a difference between community usage data and expert usage data on the second display, and wherein the community usage data indicates an overall frequency for which the particular function, relative to other functions, is used by a community of users of the application, and wherein the expert usage data indicates a frequency for which the particular function is used by expert users.

21. The non-transitory computer storage medium of claim 20, wherein presenting a respective graphical representation for each related function comprises presenting the graphical representations in a grid view layout including rows and columns of graphical representations.

22. The non-transitory computer storage medium of claim 20, wherein presenting a respective graphical representation for each related function comprises:
displaying a map including a plurality of regions;
presenting the graphical representations for the related functions over one of the regions of the map; and
presenting additional graphical representations for a different group of related functions of the application over a different region of the map.

23. The non-transitory computer storage medium of claim 20, wherein presenting a respective graphical representation for each related function comprises sorting the related functions by usage data for each function and presenting the graphical representations in an order based on the sorting.

24. The non-transitory computer storage medium of claim 20, wherein presenting a respective graphical representation for each related function comprises, for each related function, identifying associated data for the function and presenting the respective graphical representation for the function based on the associated data.

25. The non-transitory computer storage medium of claim 24, wherein presenting the respective graphical representation for the function based on the associated data includes presenting the respective graphical representation with a size, level of granularity, level of highlighting, or level of opacity based on the associated data.

26. The non-transitory computer storage medium of claim 20, wherein presenting a respective graphical representation for each related function comprises, for each related function, identifying associated data for the function and presenting the respective graphical representation for the function based on the associated data,
wherein the associated data is usage data including one or more of community usage data, community popularity data, expert usage data, and my usage data.

27. The non-transitory computer storage medium of claim 20, wherein selecting the group of related functions includes selecting functions that are related by one or more of: a usage category, a functional category, corresponding user interface elements'
locations in the graphical user interface, and how deeply nested the functions are in a hierarchy of the graphical user interface, and wherein determining that the functions are related includes analyzing a file prepared by a user who has categorized the functions or analyzing source code for the application and grouping functions that have similar attributes.

28. The non-transitory computer storage medium of claim 20, the operations further comprising:
receiving input selecting a graphical representation; and
providing textual information associated with the function corresponding to the graphical representation.

* * * * *